United States Patent
Dudar (10) Patent No.: US 11,754,012 B1
(45) Date of Patent: Sep. 12, 2023

(54) METHODS AND SYSTEMS FOR A PRESSURELESS FUEL TANK

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/805,390

(22) Filed: Jun. 3, 2022

(51) Int. Cl.
*F02D 41/22* (2006.01)
*F02D 41/00* (2006.01)
*F02M 37/00* (2006.01)

(52) U.S. Cl.
CPC .......... *F02D 41/22* (2013.01); *F02D 41/003* (2013.01); *F02M 37/0082* (2013.01); *F02D 2041/225* (2013.01); *F02D 2200/0602* (2013.01); *F02D 2200/0606* (2013.01)

(58) Field of Classification Search
CPC .. F02D 41/003; F02D 41/22; F02D 2041/225; F02D 2200/0602; F02D 2200/0606; F02M 37/0082
See application file for complete search history.

(56) References Cited

U.S. PATENT DOCUMENTS

| | | | |
|---|---|---|---|
| 3,693,825 A | | 9/1972 | Richman |
| 5,596,971 A | * | 1/1997 | Kidokoro ......... B60K 15/03519 123/518 |
| 5,746,186 A | * | 5/1998 | Kidokoro ............... B60K 15/03 137/587 |
| 6,681,789 B1 | | 1/2004 | Moulis et al. |
| 7,233,845 B2 | | 6/2007 | Veinotte |
| 8,074,627 B2 | | 12/2011 | Siddiqui |
| 9,284,924 B2 | | 3/2016 | Dudar et al. |
| 9,328,699 B2 | | 5/2016 | Dudar et al. |
| 9,488,136 B2 | | 11/2016 | Pearce et al. |
| 9,790,898 B2 | | 10/2017 | Dudar |
| 10,100,770 B2 | | 10/2018 | Dudar |
| 10,100,771 B2 | | 10/2018 | Dudar |
| 10,151,265 B2 | | 12/2018 | Dudar |
| 10,451,010 B2 | | 10/2019 | Dudar |
| 11,274,622 B1 | * | 3/2022 | Dudar ..................... F02D 41/22 |
| 11,346,308 B1 | * | 5/2022 | Dudar ............... F02M 25/0818 |
| 2004/0250795 A1 | | 12/2004 | Stroia et al. |
| 2016/0298576 A1 | | 10/2016 | Reddy et al. |
| 2019/0249622 A1 | | 8/2019 | Dudar et al. |
| 2022/0319254 A1 | * | 10/2022 | Dudar ................. G07C 5/0808 |

FOREIGN PATENT DOCUMENTS

| | | |
|---|---|---|
| DE | 102009028021 A1 | 2/2011 |
| JP | 3790017 B2 | 6/2006 |

OTHER PUBLICATIONS

Dudar, A. et al., "Methods and Systems for Diagnosing Degradation in Pressureless Fuel Tank," U.S. Appl. No. 17/222,595, filed Apr. 5, 2021, 68 of pages.
Dudar, A. et al., "Methods and Systems for a Pressureless Fuel Tank," U.S. Appl. No. 17/645,226, filed Dec. 20, 2021, 44 pages.

* cited by examiner

Primary Examiner — Hung Q Nguyen
Assistant Examiner — Mark L. Greene
(74) Attorney, Agent, or Firm — Vincent Mastrogiacomo; McCoy Russell LLP (57) ABSTRACT

Methods and systems are provided for executing a leak test diagnostic of a variable volume fuel tank. In one example, a method includes diagnosing a presence of an absence of a leak in a bellows via actuating a bellows valve fluidly coupling the bellows to a vapor canister during a key-off event.

19 Claims, 5 Drawing Sheets

METHODS AND SYSTEMS FOR A PRESSURELESS FUEL TANK

FIELD

The present description relates generally to methods and systems for a pressureless fuel tank of a vehicle, and particularly executing a leak test diagnostic for a bellows arranged therein.

BACKGROUND/SUMMARY

Vehicles, such as plug-in hybrid electric vehicles (PHEVs), may include a fuel system in which a fuel tank may be fluidically coupled to an evaporative emissions (EVAP) canister for storing, filtering, and venting fuel vapors from the fuel tank. The fuel tank may be isolatable from the EVAP canister via a fuel tank isolation valve (FTIV) such that only fuel vapors from select events may be present in a given volume (e.g., the fuel tank or the EVAP canister). For example, the fuel tank may trap diurnal fuel vapors (that is, from diurnal temperature cycles) and "running loss" fuel vapors (that is, from fuel vaporized during vehicle operation), and the EVAP canister may adsorb depressurization fuel vapors (that is, fuel vapors depressurized from the fuel tank to reduce overpressure) and refueling fuel vapors (that is, fuel vapors diverted during refilling of the fuel tank). Further, when a pressure gradient is generated due to a relatively low pressure in either an intake manifold of the vehicle or the fuel tank, fuel vapors may be passively purged from the EVAP canister.

Such fuel systems are sometimes referred to as non-integrated refueling canister-only systems (NIRCOSs). To control the various venting and flow paths for the fuel vapors during different modes of vehicle operation, actuation of complex valve and locking systems (including the FTIV) may be enabled such that no single volume in the NIRCOS is overwhelmed with excess fuel vapor pressure and that any such excess fuel vapor pressure is released. To ensure component reliability in extreme fuel vapor pressure scenarios (e.g., excess fuel vapor pressure or excess vacuum), components of the fuel system may be specially reinforced. For example, the fuel tank may be constructed from heavy steel and may include a number of standoffs supporting opposing walls of the fuel tank. To further mitigate component degradation, depressurization or venting of the fuel tank and/or the EVAP canister may be executed on a timescale ranging from a few seconds to a few minutes (e.g., depending on ambient conditions).

However, particularly lengthy depressurization/venting may result in operator frustration or confusion, as the excess fuel vapor pressure needs to be evacuated prior to opening a refueling inlet to the atmosphere. Additionally, the extra hardware used to seal and depressurize the fuel tank adds cost to the system. One approach to reducing the depressurization time and cost is to use a sealed but "pressure-less" fuel tank with a built-in variable volume device (e.g., a bellows) that expands and contracts to relieve vacuum and pressure buildups, thereby eliminating pressurization hardware and reducing costs as shown in U.S. Pat. Nos. 6,681,789; 3,693,825; and J.P. Patent No. 3,790,017.

However, the inventors herein have recognized potential issues with such systems. For instance, degradation of a bellows or other variable volume device may not be determined via existing methods. As such, a routine for determining a leak of the bellows or variable volume device may be desired.

In one example, the issues described above may be addressed by a method for determining a leak in a bellows of a sealed variable volume fuel tank of a vehicle, comprising in response to a key off event, adjusting a bellows valve to fluidly couple an internal volume of a bellows to a canister. In this way, a temperature of the canister may be monitored to determine a degradation of the bellows.

As one example, the bellows valve is a three-way valve configured to seal an interior volume of the bellows from the canister and atmosphere or fluidly couple the interior volume to the canister or atmosphere. The bellows valve may be commanded to different positions in response to a leak test diagnostic being initiated and in response to a result of the leak test diagnostic. By doing this, a condition of the bellows may be determined while refueling depressurization times and hardware are eliminated.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
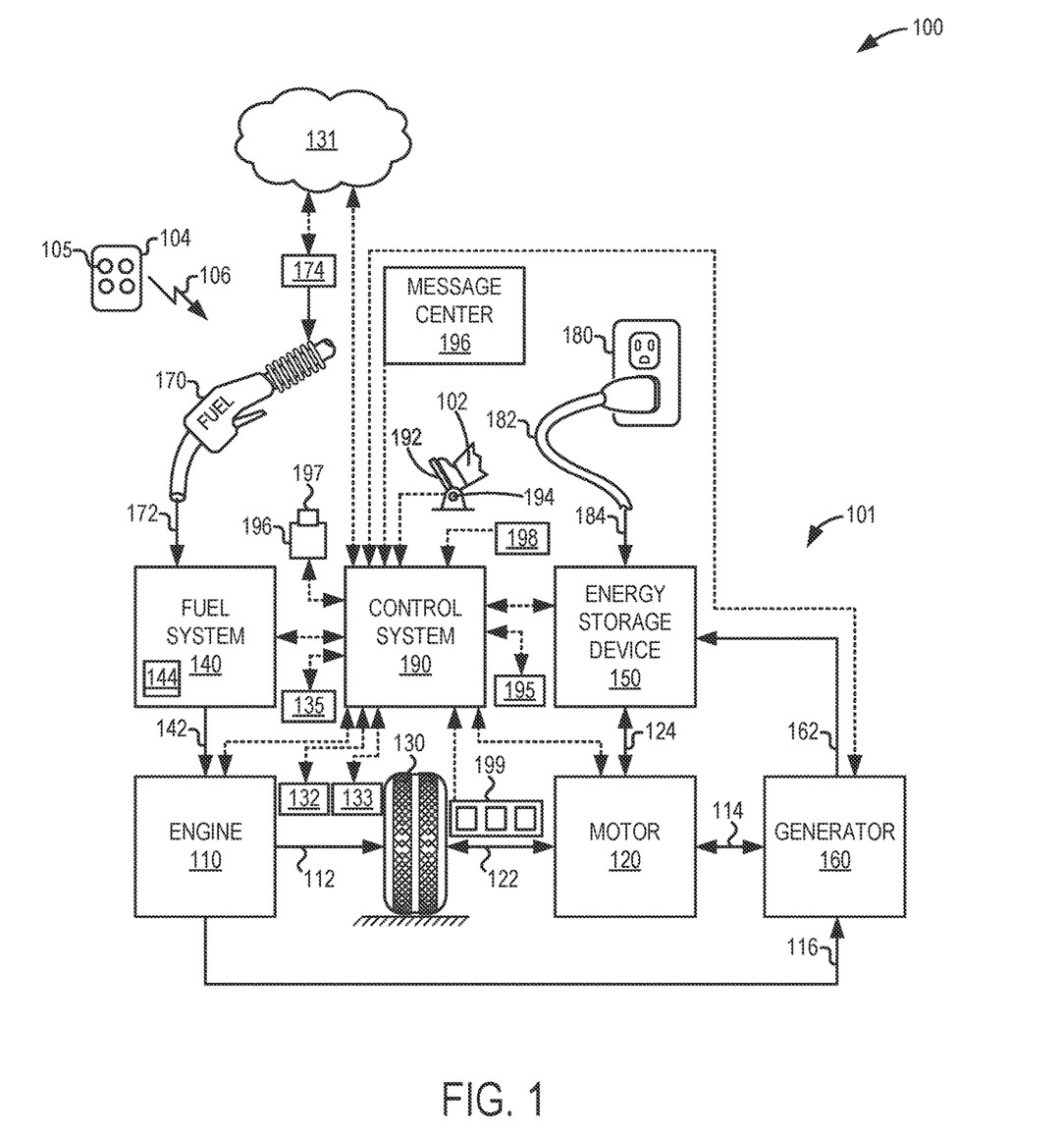
FIG. 1 shows a high-level block diagram illustrating an example vehicle system.
Figure 2:
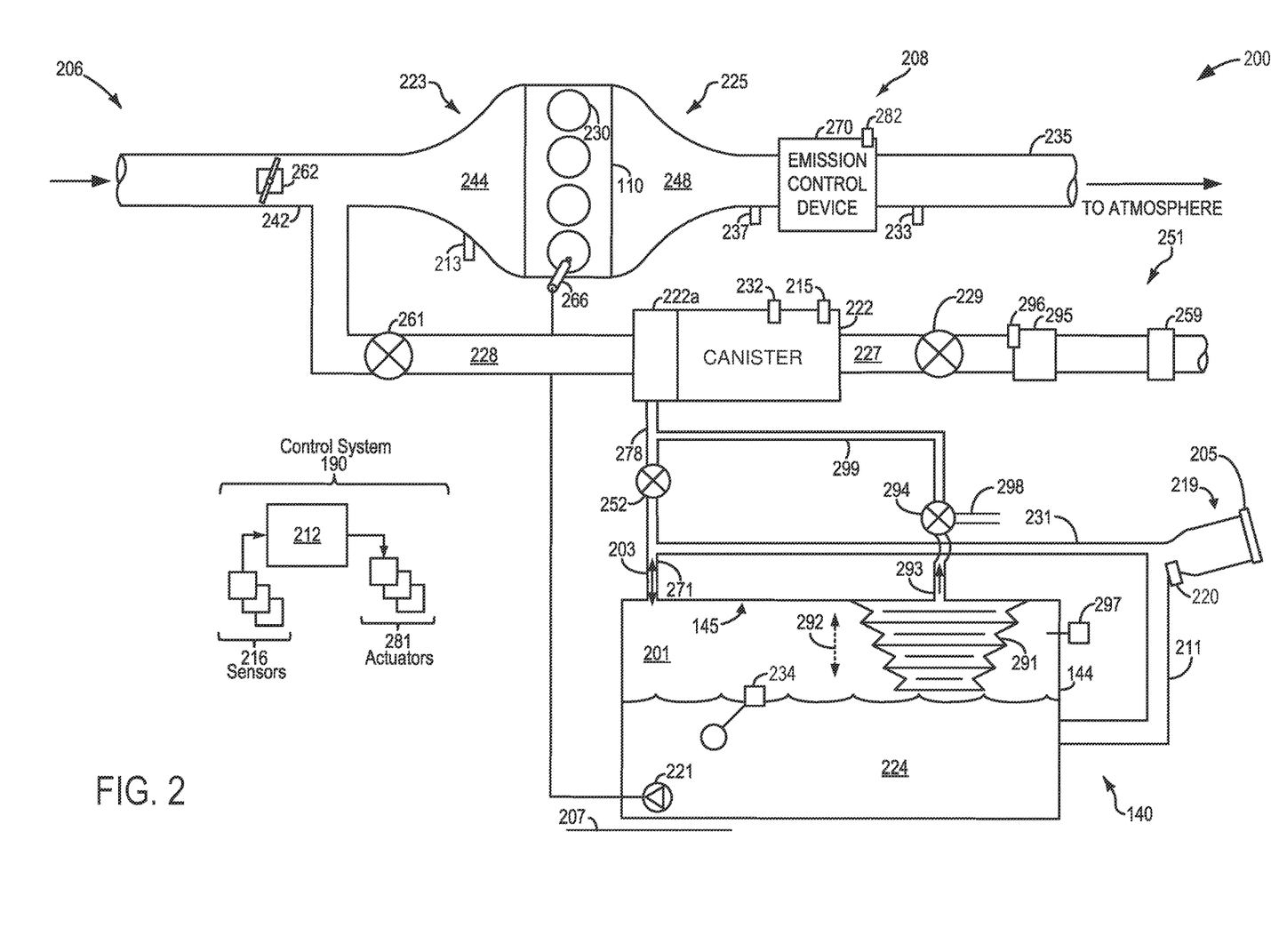
FIG. 2 shows a schematic diagram of a portion of the example vehicle system of FIG. 1, the portion of the example vehicle system including a fuel system and an evaporative emissions control system.
Figure 3A:
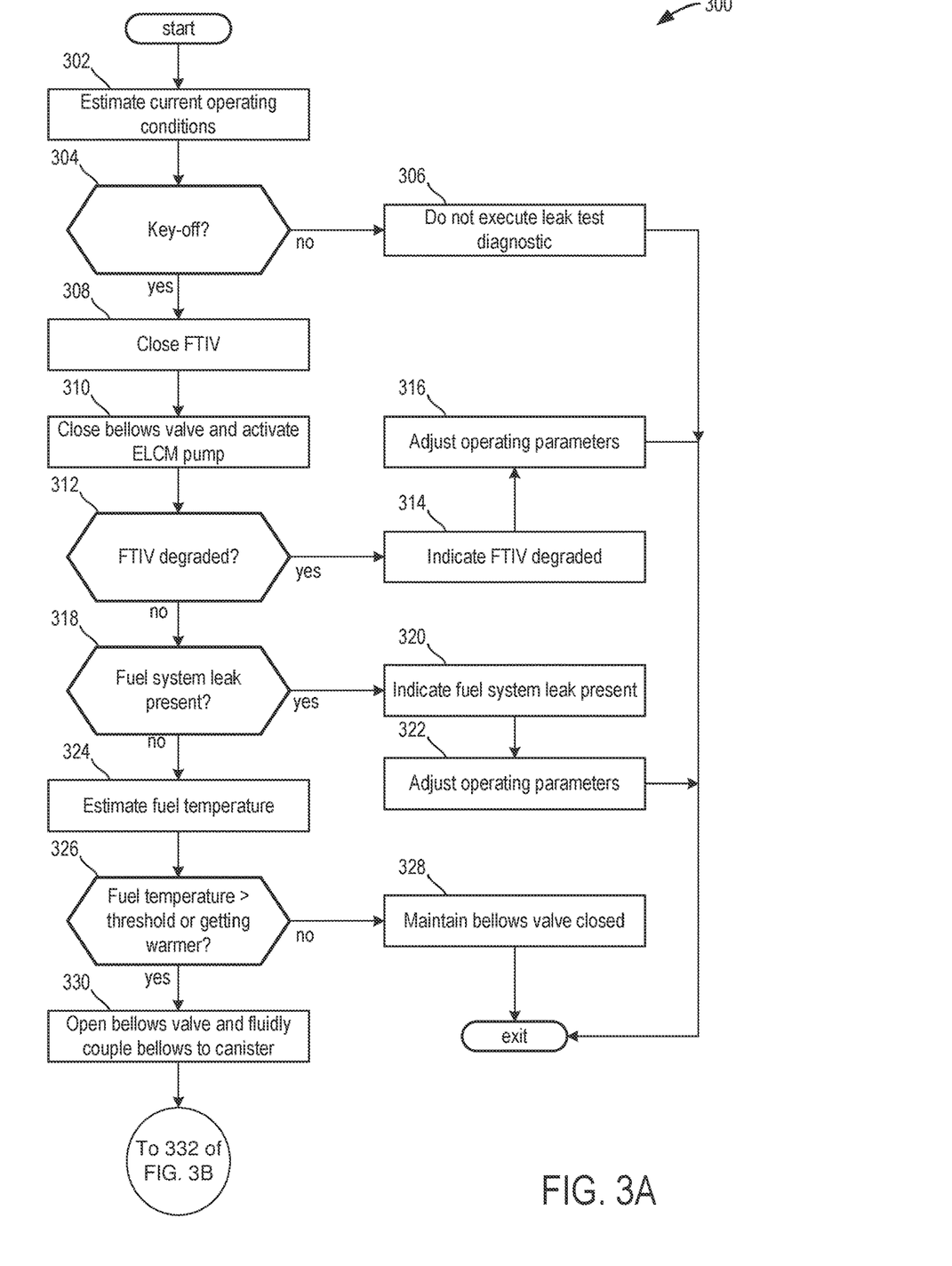
FIGS. 3A and 3B show a high-level flow chart of an example method for performing a leak test diagnostic of a sealed variable volume fuel tank and a bellows arranged therein.
Figure 3B:
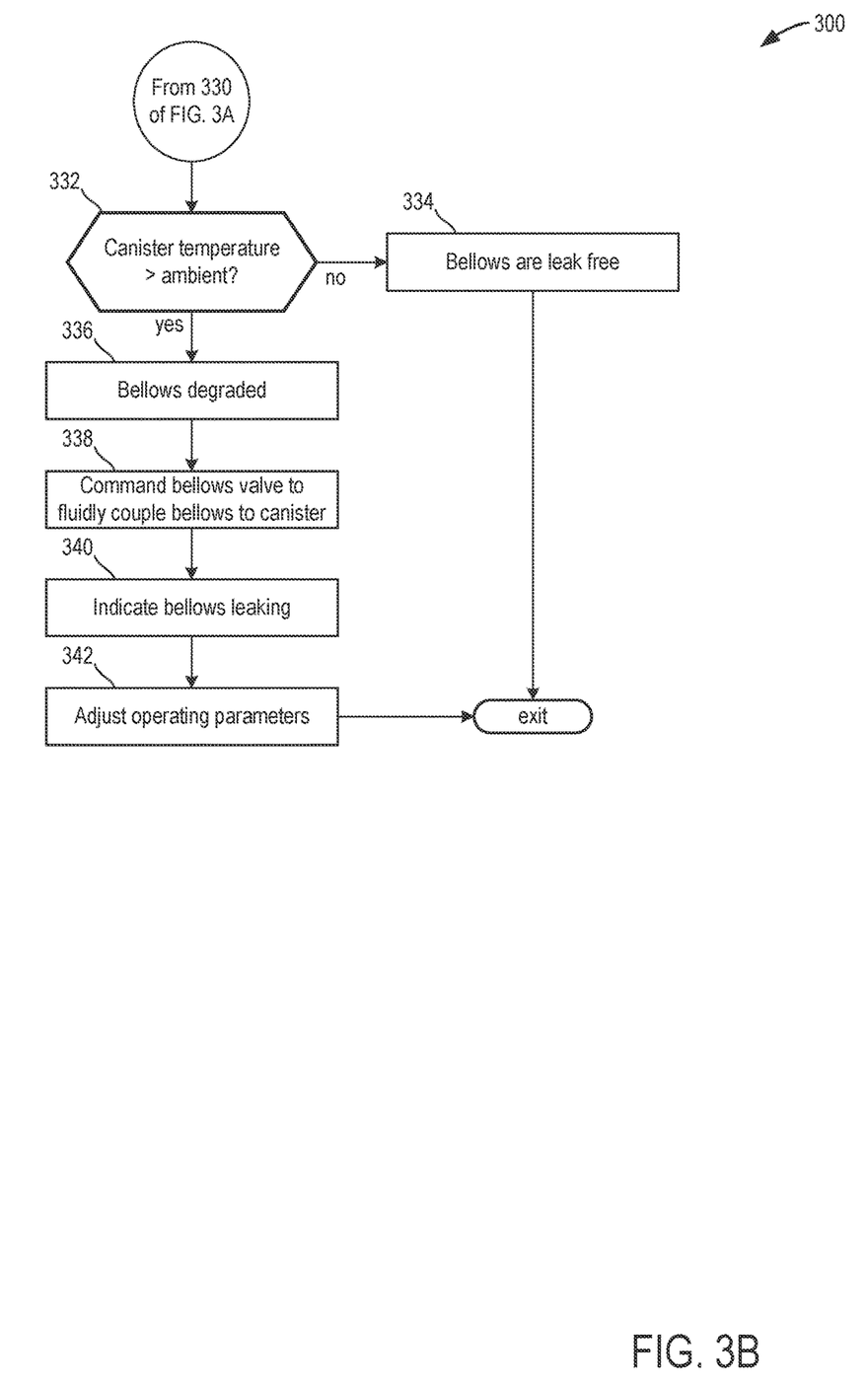
Figure 4:
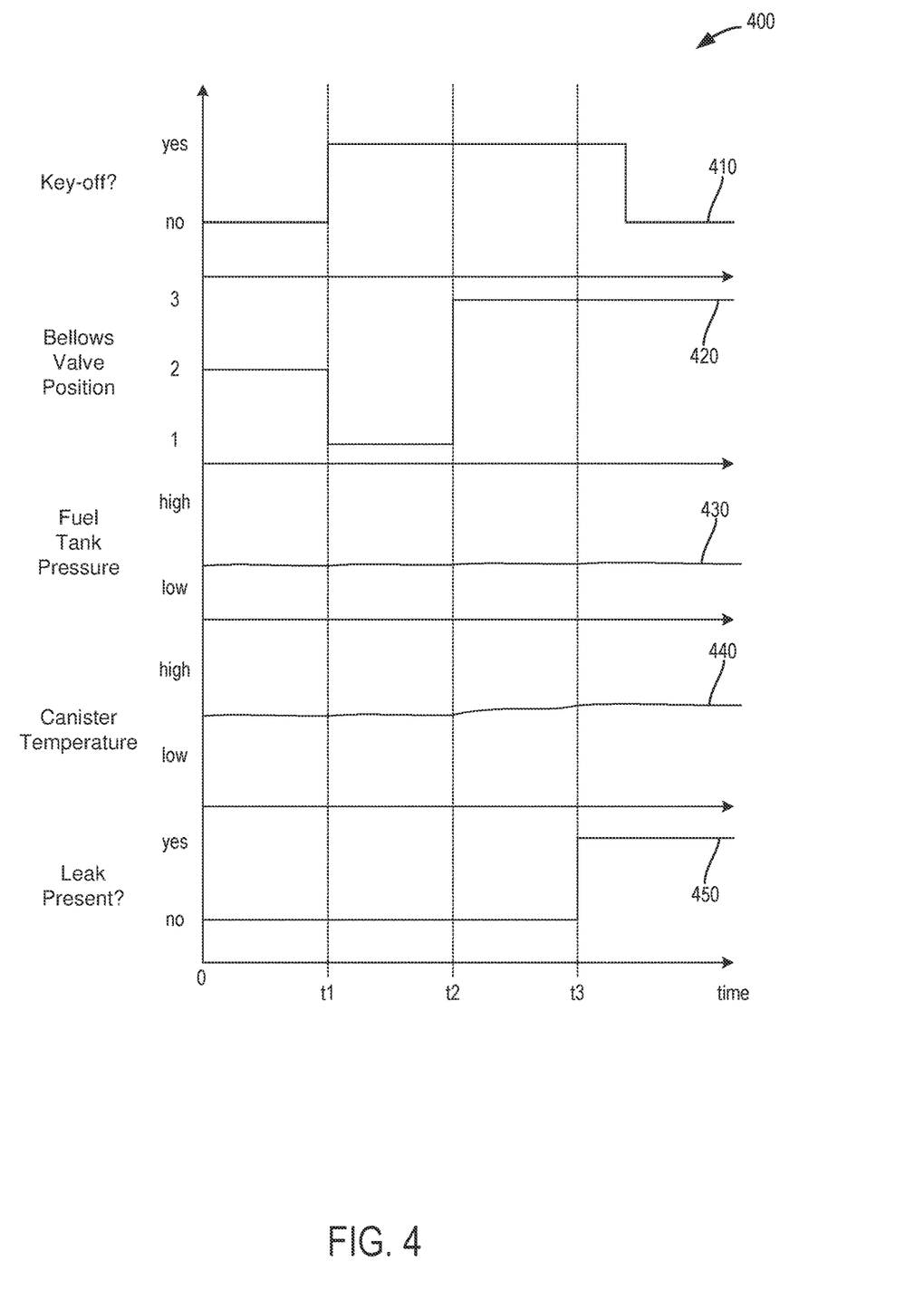
FIG. 4 shows a timing diagram for example prophetic operation of a variable volume fuel tank of a vehicle, such as the vehicle system of FIG. 2.

The following description relates to methods and systems for performing a leak test diagnostic of a variable volume fuel tank (e.g., a pressure-less fuel tank) included in the vehicle system of FIGS. 1 and 2. A control routine may be implemented by a controller included in the vehicle system, the controller configured to perform a series of actions to initiate the leak test diagnostic during a key-off event. An example routine is illustrated in FIGS. 3A and 3B. A timing diagram of the routine is illustrated in FIG. 4. The routine may block vapors from leaking through the bellows to atmosphere when a leak is determined. The bellows valve may be actuated to flow fuel tank vapors to the canister where the vapors may be stored and combusted by the engine during a subsequent key-on event.

Referring now to FIG. 1, a high-level block diagram 100 depicting an example vehicle propulsion system 101 is shown. Vehicle propulsion system 101 includes an engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. In such an example, a vehicle with vehicle propulsion system 101 may be referred to as a hybrid electric vehicle (HEV).

Vehicle propulsion system 101 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via one or more drive wheels 130 (as indicated by an arrow 122) while engine 110 is deactivated.

During other operating conditions, engine 110 may be set to a deactivated state (as described above) while motor 120 may be operated to charge an energy storage device 150. For example, motor 120 may receive wheel torque from drive wheel(s) 130 (as indicated by arrow 122), where the motor may convert the kinetic energy of the vehicle to electrical energy for storage at an energy storage device 150 (as indicated by an arrow 124). This operation may be referred to as regenerative braking of the vehicle. Thus, motor 120 can provide a generator function in some examples. However, in other examples, a generator 160 may instead receive wheel torque from drive wheel(s) 130, where the generator may convert the kinetic energy of the vehicle to electrical energy for storage at energy storage device 150 (as indicated by an arrow 162).

During still other operating conditions, engine 110 may be operated by combusting fuel received from a fuel system 140 (as indicated by an arrow 142). For example, engine 110 may be operated to propel the vehicle via drive wheel(s) 130 (as indicated by an arrow 112) while motor 120 is deactivated. During other operating conditions, both engine 110 and motor 120 may each be operated to propel the vehicle via drive wheel(s) 130 (as indicated by arrows 112, 122, respectively). A configuration where both engine 110 and motor 120 may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 101 may be configured as a series type vehicle propulsion system, whereby engine 110 does not directly propel drive wheel(s) 130. Rather, engine 110 may be operated to power motor 120, which may in turn propel the vehicle via drive wheel(s) 130 (as indicated by arrow 122). For example, during select operating conditions, engine 110 may drive generator 160 (as indicated by an arrow 116), which may in turn supply electrical energy to one or more of motor 120 (as indicated by an arrow 114) and energy storage device 150 (as indicated by arrow 162). As another example, engine 110 may be operated to drive motor 120, which may in turn provide a generator function to convert engine output to electrical energy, where the electrical energy may be stored at energy storage device 150 for later use by motor 120.

Fuel system 140 may include one or more fuel tank(s) 144 for storing fuel onboard the vehicle. For example, fuel tank 144 may store one or more liquid fuels, including but not limited to gasoline, diesel, and alcohol fuels. In some examples, the fuel may be stored onboard the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 (as indicated by arrow 142). Still other suitable fuels or fuel blends may be supplied to engine 110, where they may be combusted at engine 110 to produce the engine output. The engine output may be utilized to propel the vehicle (e.g., via drive wheel(s) 130, as indicated by arrow 112) or to recharge energy storage device 150 via motor 120 or generator 160. The fuel tank 144 may be a sealed variable volume fuel tank, with bellows providing the variable volume. The fuel tank is sealed except for only a fuel tank isolation valve port and a fuel filler pipe (e.g., a neck) as described herein.

In some examples, energy storage device 150 may be configured to store electrical energy that may be supplied to other electrical loads residing onboard the vehicle (other than motor 120), including cabin heating and air conditioning, engine starting, headlights, cabin audio and video systems, etc. As a non-limiting example, energy storage device 150 may include one or more batteries and/or capacitors.

A control system 190 may communicate at least with one or more of engine 110, motor 120, fuel system 140, energy storage device 150, and generator 160. Specifically, control system 190 may receive sensory feedback information at least from one or more of engine 110, motor 120, fuel system 140, energy storage device 150, and generator 160. Further, control system 190 may send control signals at least to one or more of engine 110, motor 120, fuel system 140, energy storage device 150, and generator 160 responsive to the sensory feedback information. Control system 190 may receive an indication of an operator requested output of vehicle propulsion system 101 from a vehicle operator 102. For example, control system 190 may receive sensory feedback from a pedal position sensor 194, which communicates with a pedal 192. Pedal 192 may refer schematically to a brake pedal and/or an accelerator pedal. Furthermore, in some examples, control system 190 may be in communication with a remote engine start receiver 195 (or transceiver) that receives wireless signals 106 from a key fob 104 having a remote start button 105. In other examples (not shown), a remote engine start may be initiated via a cellular telephone or smartphone based system where a cellular telephone or smartphone (e.g., operated by vehicle operator 102) may send data to a server and the server may communicate with the vehicle (e.g., via a wireless network 131) to start engine 110.

Energy storage device 150 may periodically receive electrical energy from a power source 180 residing external to the vehicle, e.g., not part of the vehicle (as indicated by an arrow 184). As a non-limiting example, vehicle propulsion system 101 may be configured as a plug-in HEV (PHEV), whereby electrical energy may be supplied to energy storage device 150 from power source 180 via an electrical energy transmission cable 182. During a recharging operation of energy storage device 150 from power source 180, electrical energy transmission cable 182 may electrically couple energy storage device 150 to power source 180. When vehicle propulsion system 101 is subsequently operated to propel the vehicle, electrical energy transmission cable 182 may be disconnected between power source 180 and energy storage device 150. Control system 190 may identify and/or control an amount of electrical energy stored at energy storage device 150, which may be referred to as a state of charge (SOC).

In other examples, electrical energy transmission cable 182 may be omitted, and electrical energy may instead be received wirelessly at energy storage device 150 from power source 180. For example, energy storage device 150 may receive electrical energy from power source 180 via one or more of electromagnetic induction, radio waves, and electromagnetic resonance. More broadly, any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle (e.g., during a refueling event). As a non-limiting example, vehicle propulsion system 101 may be refueled by receiving fuel via a fuel dispensing device 170 (as indicated by an arrow 172), the fuel dispensing device being supplied with fuel by an external fuel pump 174. In some examples, fuel tank 144 may be configured to store the fuel received from fuel dispensing device 170 until the fuel is supplied to engine 110 for combustion. In some examples, control system 190 may receive an indication of a level of the fuel stored at fuel tank 144 (also referred to herein as the fuel level or fill level of fuel tank 144) via a fuel level sensor. The level of fuel stored at fuel tank 144 (e.g., as identified by the fuel level sensor) may be communicated to vehicle operator 102, for example, via a fuel gauge or indication in a vehicle instrument panel 196. In additional or alternative examples, control system 190 may be coupled to external fuel pump 174 via wireless network 131 (e.g., in a "smart" fuel pump configuration). In such examples, control system 190 may receive (e.g., via wireless network 131) signals indicative of an amount of fuel dispensed, a rate of fueling (e.g., during the refueling event), a distance of the vehicle from external fuel pump 174, an amount of money or credit available to vehicle operator 102 with which to purchase fuel at external fuel pump 174, etc. Accordingly, an expected level of fuel may be determined by control system 190 based on the signal received from external fuel pump 174. In some examples, vehicle instrument panel 196 may include a refueling button, which may be manually actuated or pressed by a vehicle operator to initiate refueling. For example, in response to the vehicle operator actuating the refueling button, fuel tank 144 in the vehicle may be depressurized so that refueling may be performed.

Vehicle propulsion system 101 may also include an ambient temperature/humidity sensor 198, and a roll stability control sensor, such as a lateral and/or longitudinal and/or yaw rate sensor(s) 199. As shown, sensors 198, 199 may be communicably coupled to control system 190, such that the control system may receive signals from the respective sensors. Vehicle instrument panel 196 may include indicator light(s) and/or a text-based display in which messages are displayed to vehicle operator 102 (e.g., such as an indication of a degradation status of a vehicle component generated by a diagnostic control routine). Vehicle instrument panel 196 may also include various input portions 197 for receiving an operator input, such as depressible buttons, touch screens, voice input/recognition, etc.

In some examples, vehicle propulsion system 101 may include one or more onboard cameras 135. Onboard camera(s) 135 may communicate photo and/or video imaging data to control system 190, for example. Onboard camera(s) 135 may in some examples be utilized to record images within a predetermined radius of the vehicle, for example. As such, control system 190 may employ signals (e.g., imaging data) received by onboard camera(s) 135 to detect and identify objects and locations external to the vehicle.

In additional or alternative examples, vehicle instrument panel 196 may communicate audio messages to vehicle operator 102 in combination with, or entirely without, visual display. Further, sensor(s) 199 may include a vertical accelerometer to indicate road roughness, the vertical accelerometer being communicably coupled to control system 190, for example. As such, control system 190 may adjust engine output and/or wheel brakes to increase vehicle stability in response to signals received from sensor(s) 199.

Control system 190 may be communicably coupled to other vehicles or infrastructures using appropriate communications technology. For example, control system 190 may be coupled to other vehicles or infrastructures via wireless network 131, which may comprise Wi-Fi, Bluetooth®, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles may be either direct between vehicles, or multi-hop. In some examples, longer range communications (e.g., WiMax) may be used in place of, or in conjunction with, V2V or V2I2V to extend coverage area on an order of a few miles. In still other examples, control system 190 may be communicably coupled to other vehicles or infrastructures via wireless network 131 and the Internet (e.g., cloud). In further examples, wireless network 131 may be a plurality of wireless networks 131 across which data may be communicated to vehicle propulsion system 101.

Vehicle propulsion system 101 may also include an onboard navigation system 132 (for example, a global positioning system, or GPS) with which vehicle operator 102 may interact. Onboard navigation system 132 may include one or more location sensors for assisting in estimating vehicle speed, vehicle altitude, vehicle position/location, etc. Such information may be used to infer engine operating parameters, such as local barometric pressure. As discussed above, control system 190 may be configured to receive information via the Internet or other communication networks. Accordingly, information received at control system 190 from onboard navigation system 132 may be cross-referenced to information available via the Internet to determine local weather conditions, local vehicle regulations, etc. In some examples, vehicle propulsion system 101 may include laser sensors (e.g., lidar sensors), radar sensors, sonar sensors, and/or acoustic sensors 133, which may enable vehicle location information, traffic information, etc., to be collected via the vehicle.

Referring now to FIG. 2, a schematic diagram 200 depicting a vehicle system 206 is shown. In some examples, vehicle system 206 may be an HEV system, such as a PHEV system. For example, vehicle system 206 may be the same as vehicle propulsion system 101 of FIG. 1. However, in other examples, vehicle system 206 may be implemented in a non-hybrid vehicle (e.g., a vehicle equipped with an engine and without a motor operable to at least partially propel the vehicle).

Vehicle system 206 may include an engine system 208 coupled to each of an evaporative emissions control system 251 and fuel system 140. Engine system 208 may include engine 110 having a plurality of cylinders 230. Engine 110 may include an engine air intake system 223 and an engine exhaust system 225. Engine air intake system 223 may include a throttle 262 in fluidic communication with an engine intake manifold 244 via an intake passage 242. Further, engine air intake system 223 may include an air box and filter (not shown) positioned upstream of throttle 262. Engine exhaust system 225 may include an exhaust manifold 248 leading to an exhaust passage 235 that routes exhaust gas to the atmosphere. Engine exhaust system 225 may include an emission control device 270, which in one example may be mounted in a close-coupled position in exhaust passage 235 (e.g., closer to engine 110 than an outlet of exhaust passage 235) and may include one or more exhaust catalysts. For instance, emission control device 270 may include one or more of a three-way catalyst, a lean nitrogen oxide ($NO_x$) trap, a diesel particulate filter, an oxidation catalyst, etc. In some examples, an electric heater 282 may be coupled to emission control device 270, and utilized to heat emission control device 270 to or beyond a predetermined temperature (e.g., a light-off temperature of emission control device 270).

It will be appreciated that other components may be included in engine system 208 such as a variety of valves and sensors. For example, a barometric pressure sensor 213 may be included in engine air intake system 223. In one example, barometric pressure sensor 213 may be a manifold air pressure (MAP) sensor and may be coupled to engine intake manifold 244 downstream of throttle 262. Barometric pressure sensor 213 may rely on part throttle or full or wide open throttle conditions, e.g., when an opening amount of throttle 262 is greater than a threshold, in order to accurately determine a barometric pressure.

Fuel system 140 may include fuel tank 144 coupled to a fuel pump system 221. Fuel pump system 221 may include one or more pumps for pressurizing fuel delivered to cylinders 230 via fuel injectors 266 during a single cycle of cylinders 230 (while only a single fuel injector 266 is shown at FIG. 2, additional fuel injectors may be provided for each cylinder 230). A distribution or relative amounts of fuel delivered, injection timing, etc. may vary with operating conditions such as engine load, engine knock, exhaust temperature, etc. responsive to different operating or degradation states of fuel system 140, engine 110, etc.

Fuel system 140 may be a return-less fuel system, a return fuel system, or any one of various other types of fuel system. Fuel tank 144 may hold a fuel 224 including a plurality of fuel blends, e.g., fuel with a range of alcohol concentrations, such as gasoline, various gasoline-ethanol blends (including E10, E85), etc. A fuel level sensor 234 disposed in fuel tank 144 may provide an indication of the fuel level ("Fuel Level Input") to a controller 212 included in control system 190. As depicted, fuel level sensor 234 may include a float coupled to a variable resistor. Alternatively, other types of fuel level sensors may be used.

Vapors generated in fuel system 140 may be routed to evaporative emissions control system 251 via vapor recovery line 231, before being purged to engine air intake system 223. Vapor recovery line 231 may be coupled to fuel tank 144 via one or more conduits. For example, vapor recovery line 231 may be coupled to fuel tank 144 via at least one conduit 271.

Evaporative emissions control system 251 may further include one or more fuel vapor containers or EVAP canisters 222 for capturing and storing fuel vapors. EVAP canister 222 may be coupled to fuel tank 144 via at least one conduit 278 including at least one fuel tank isolation valve (FTIV) 252 for isolating the fuel tank during certain conditions. Fuel tank 144 may be sealed except for fuel tank isolation port 203 and the operation of FTIV 252. FTIV 252 may be operated in an open or a close position, depending on conditions described herein. For example, during engine operation, FTIV 252 may be kept closed to limit the amount of diurnal or "running loss" vapors directed to canister 222 from fuel tank 144. During refueling operations and selected purging conditions, FTIV 252 may be temporarily opened, e.g., for a duration, to direct fuel vapors from the fuel tank 144 to EVAP canister 222. FTIV 252 may also be temporarily opened when the fuel tank pressure is higher than a threshold (e.g., above a mechanical pressure limit of the fuel tank), such that fuel vapors may be released into EVAP canister 222 and the fuel tank pressure is maintained below the threshold.

In some examples, vapor recovery line 231 may be coupled to a fuel tank refilling or refueling system 219. In some examples, refueling system 219 may include a fuel cap 205 for sealing off the refueling system from the atmosphere. Refueling system 219 may be coupled to fuel tank 144 via a neck or fuel filler pipe 211. In some examples, fuel filler pipe 211 may include a flow meter sensor 220 operable to monitor a flow of fuel being supplied to fuel tank 144 via the fuel filler pipe (e.g., during refueling).

During refueling, fuel cap 205 may be manually opened or may be automatically opened responsive to a refueling request received at controller 212. A fuel dispensing device (e.g., 170) may be received by, and thereafter fluidically coupled to, refueling system 219, whereby fuel may be supplied to fuel tank 144 via fuel filler pipe 211. Refueling may continue until the fuel dispensing device is manually shut off or until fuel tank 144 is filled to a threshold fuel level (e.g., until feedback from fuel level sensor 234 indicates the threshold fuel level has been reached), at which point a mechanical or otherwise automated stop of the fuel dispensing device may be triggered.

Evaporative emissions control system 251 may include one or more emissions control devices, such as EVAP canister 222 filled with an appropriate adsorbent, the canister being configured to temporarily trap fuel vapors (including vaporized hydrocarbons) during refueling operations. In one example, the adsorbent used may be activated charcoal. Evaporative emissions control system 251 may further include a canister ventilation path or vent line 227, which may route gases out of EVAP canister 222 to the atmosphere when storing, or trapping, fuel vapors from fuel system 140.

EVAP canister 222 may include a buffer 222a (or buffer region), each of the canister and the buffer including the adsorbent. As shown, a volume of buffer 222a may be smaller than (e.g., a fraction of) a volume of EVAP canister 222. The adsorbent in buffer 222a may be the same as, or different from, the adsorbent in EVAP canister 222 (e.g., both may include charcoal). Buffer 222a may be positioned within EVAP canister 222 such that, during canister loading, fuel tank vapors may first be adsorbed within the buffer, and then when the buffer is saturated, further fuel tank vapors may be adsorbed in a remaining volume of the EVAP canister. In comparison, during purging of EVAP canister 222, fuel vapors may first be desorbed from the EVAP canister (e.g., to a threshold amount) before being desorbed from buffer 222a. In other words, loading and unloading of buffer 222a may not be linear with loading and unloading of EVAP canister 222. As such, one effect of buffer 222a is to dampen any fuel vapor spikes flowing from fuel tank 144 to EVAP canister 222, thereby reducing a possibility of any fuel vapor spikes going to engine 110.

In some examples, one or more temperature sensors 232 may be coupled to and/or within EVAP canister 222. As fuel vapor is adsorbed by the adsorbent in EVAP canister 222, heat may be generated (heat of adsorption). Likewise, as fuel vapor is desorbed by the adsorbent in EVAP canister 222, heat may be consumed. In this way, the adsorption and desorption of fuel vapor by EVAP canister 222 may be monitored and estimated based on temperature changes within the canister. In one example, one or more oxygen sensors 215 may be coupled to and/or within the canister to monitor canister breakthrough and provide an estimate of a canister load to the controller 212.

Vent line 227 may also allow fresh air to be drawn into EVAP canister 222 when purging stored fuel vapors from fuel system 140 to engine air intake system 223 via purge line 228 and purge valve 261. For example, purge valve 261 may normally be closed but may be opened during certain conditions so that vacuum from engine intake manifold 244 may be provided to EVAP canister 222 for purging. In some examples, vent line 227 may further include an air filter 259 disposed therein downstream of EVAP canister 222.

Flow of air and vapors between EVAP canister 222 and the atmosphere may be regulated by a canister vent valve 229. Canister vent valve 229 may be a normally open valve, so that FTIV 252 may control venting of fuel tank 144 with the atmosphere. As described above, FTIV 252 may be positioned between fuel tank 144 and EVAP canister 222 within conduit 278. FTIV 252 may be a normally closed valve such that fuel tank 144 may be sealed under standard operating conditions. In some examples, FTIV 252 in an open position allows for venting of fuel vapors from fuel tank 144 to EVAP canister 222. Fuel vapors may then be vented to atmosphere via canister vent valve 229, or purged to engine air intake system 223 via canister purge valve 261.

In some examples, evaporative emissions control system 251 may further include an evaporative level check monitor (ELCM) 295. ELCM 295 may be disposed in vent line 227 and may be configured to control venting and/or assist in detection of undesired evaporative emissions. As an example, ELCM 295 may include a vacuum pump for applying negative pressure to the fuel system when administering a test for undesired evaporative emissions. In some embodiments, the vacuum pump may be configured to be reversible. In other words, the vacuum pump may be configured to apply either a negative pressure or a positive pressure on the evaporative emissions control system 251 and fuel system 140. ELCM 295 may further include a reference orifice (not shown), a pressure sensor (not shown), and a changeover valve (COV) 296. A reference check may thus be performed whereby a vacuum may be drawn across the reference orifice, where the resulting vacuum level comprises a vacuum level indicative of an absence of undesired evaporative emissions. For example, following the reference check, the fuel system 140 and evaporative emissions control system 251 may be evacuated by the ELCM vacuum pump. In the absence of undesired evaporative emissions, the vacuum may pull down to the reference check vacuum level. Alternatively, in the presence of undesired evaporative emissions, the vacuum may not pull down to the reference check vacuum level.

During select engine and/or vehicle operating conditions, such as after an emission control device light-off temperature has been attained (e.g., a threshold temperature reached after warming up from ambient temperature) and with the engine running, the controller 212 may control the ELCM 295 changeover valve (COV) 296 to enable EVAP canister 222 to be fluidically coupled to atmosphere. For example, ELCM COV 296 may be configured in an open position, where the first position includes the EVAP canister 222 fluidically coupled to atmosphere, except during pressure tests performed on the system. In an example, under natural aspiration conditions (e.g., intake manifold vacuum conditions), ELCM COV 296 may be adjusted to a closed position to seal the EVAP canister 222 from atmosphere. By commanding ELCM COV 296 to the closed position, the evaporative emissions control system 251 and fuel system 140 may be evacuated in order to ascertain the presence or absence of undesired evaporative emissions.

Fuel system 140 may be a non-integrated refueling canister-only system (NIRCOS), in that fuel tank 144 may be substantially isolatable from EVAP canister 222 such that fuel vapors in fuel tank 144 and EVAP canister 222 may be independently controlled as desired (e.g., during refueling). During periods in which fuel tank 144 is fluidically decoupled from EVAP canister 222, a fuel vapor pressure may develop within the fuel tank. Accordingly, venting and depressurization control routines are often implemented for NIRCOS fuel tanks, along with structural reinforcement thereof. For example, a given NIRCOS may include numerous valves and venting lines coupled to fuel tank(s) included therein to ensure that any excess fuel vapor pressure is properly evacuated or redistributed. Further, NIRCOS fuel tanks may be constructed of high tensile-strength material, such as heavy steel, and configured with a plurality of standoffs therein, the plurality of standoffs extending between opposing walls of a given NIRCOS fuel tank, such that greater fuel vapor pressures may be withstood without fuel tank degradation.

As an alternative, fuel system 140 may include a bellows 291 to maintain a fuel vapor pressure of fuel tank 144 at, or near, atmospheric pressure. As such, complex structural configurations for managing excess fuel vapor pressure may be obviated. Specifically, bellows 291 may be disposed within and coupled to an upper surface 145 of fuel tank 144 having an atmospheric port 293. Bellows 291 may be coupled to upper surface 145, e.g., a top, of the fuel tank relative to ground 207 on which the vehicle system travels.

As shown in FIG. 2, the fuel level of fuel 224 in fuel tank 144 may be entirely below bellows 291, such that the (liquid) fuel may not be physically contacting the bellows and the bellows may be in a maximally expanded configuration. As the bellows 291 is contacted by rising fuel 224 during refueling, the bellows may compress along an axis 292 proportionally with an increase in the fuel level in fuel tank 144 (up until the bellows reaches a maximally compressed configuration). During compression, air within bellows 291 may be evacuated via the atmospheric port 293. After refueling and during engine operation, fuel 224 may be provided to engine 110 via actuation of fuel pump system 221, such that the fuel level in fuel tank 144 may fall and bellows 291 may expand proportionally along axis 292 (up until the bellows again attains the maximally expanded configuration). During expansion, a pressure differential may be generated between bellows 291 and the surrounding environment such that air may be induced into the bellows via the atmospheric port 293.

In this way, a variable volume configuration may be provided to fuel tank 144 via expansion and contraction of bellows 291, such that a fuel vapor pressure of the fuel tank may be maintained within a threshold range of a predetermined pressure (e.g., an ambient pressure of the surrounding environment). In some examples, the fuel vapor pressure of fuel tank 144 may be maintained within the threshold range even across widely varying ambient temperatures, such as between 40 and 95° F. As such, fuel tank 144 may be formed from materials having relatively weaker strength and including fewer or no standoffs therein. Further, a more simplified configuration of valves and lines may be included in fuel system 140 relative to other NIRCOSs, as complex depressurization/venting routines may be obviated by the presence of bellows 291.

The atmospheric port 293 of bellows 291 may be routed to conduit 278 and/or the canister 222 via vapor line 299. In one example, a valve, herein referred to as bellows valve 294, may be fluidly coupled to an internal volume of bellows 291 and an atmospheric port 293. In one example, bellows valve 294 may be open during vehicle operation and fluidly couples the bellows 291 to atmosphere via conduit 298. In another example, the controller may operate bellows valve 294 responsive to operating conditions to fluidly couple the atmospheric port 293 to the conduit 278 (e.g., the canister 222). In the illustrated example, a first end of vapor line 299 is attached to atmospheric port 293 of bellows 291 and a second end of vapor line 299 is conduit 278 upstream of canister 222. The controller may actuate the bellows valve 294 to a closed position during vehicle off to execute a leak test diagnostic. If the bellows 291 are determined to include a leak during the leak test diagnostic, then a flag may be set and the bellows valve 294 may be adjusted to fluidly couple the atmospheric port 293 to the canister 222 and not the conduit 298 (e.g., atmosphere). By doing this, fuel vapors from the fuel tank leaking through the bellows 291 may be captured by the canister 222.

Fuel system 140 may be operated by controller 212 in a plurality of modes by selective adjustment of the various valves (e.g., responsive to the various sensors). For example, fuel system 140 may be operated in a refueling mode (e.g., when refueling is requested by a vehicle operator), wherein controller 212 may close FTIV 252, allowing bellows 291 to maintain the fuel vapor pressure of fuel tank 144 within the threshold range of the predetermined pressure. However, if bellows 291 is compressed to the maximally compressed configuration, and the fuel vapor pressure begins increasing beyond that is manageable by fuel tank 144 (e.g., when the fuel tank becomes undesirably overfilled), fuel system 140 may be operated in a venting mode. In the venting mode, controller 212 may open FTIV 252 and canister vent valve 229, while maintaining canister purge valve 261 closed, to direct refueling vapors into EVAP canister 222 while preventing fuel vapors from being directed into engine intake manifold 244 (and thus provide a venting path for fuel vapors). As such, opening FTIV 252 may allow refueling vapors to be stored in EVAP canister 222. After refueling is completed, at least FTIV 252 may be closed once again.

As another example, the fuel system may be operated in a canister purging mode (e.g., after a given emission control device light-off temperature has been attained and with engine 110 running), wherein controller 212 may open canister purge valve 261 and canister vent valve 229 while closing FTIV 252. Herein, the vacuum generated by engine intake manifold 244 of (operating) engine 110 may be used to draw fresh air through vent line 227 and through EVAP canister 222 to purge stored fuel vapors into engine intake manifold 244. As such, in the canister purging mode, the purged fuel vapors from EVAP canister 222 may be combusted in engine 110. The canister purging mode may be continued until an amount or level of stored fuel vapors in EVAP canister 222 are below a threshold amount or level.

Control system 190, including controller 212, is shown receiving information from a plurality of sensors 216 (various examples of which are described herein) and sending control signals to a plurality of actuators 281 (various examples of which are described herein). As one example, sensors 216 may include one or more of exhaust gas sensor 237 located upstream of emission control device 270 in exhaust passage 235, temperature sensor 233 located downstream of emission control device 270 in exhaust passage 235, flow meter sensor 220 located in fuel filler pipe 211, fuel level sensor 234 located in fuel tank 144, and temperature sensor 232 and oxygen sensor 215 located in EVAP canister 222. Other sensors such as pressure, temperature, air/fuel ratio, and composition sensors may be coupled to various locations in vehicle system 206 (for example, a fuel tank pressure sensor 297 may further be included in fuel tank 144). As an additional or alternative example, actuators 281 may include fuel injector 266, throttle 262, FTIV 252, bellows valve 294, canister purge valve 261, canister vent valve 229, and ELCM COV 296. Controller 212 may receive input data from sensors 216, process the input data, and trigger actuators 281 in response to the processed input data based on instructions or code programmed in non-transitory memory therein, the instructions or code corresponding to one or more control routines. For example, during a vehicle off condition or during a refueling event, control system 190 may be configured to monitor a fuel level of fuel tank 144 and the amount of fuel supplied to the fuel tank.

Referring now to FIGS. 3A and 3B, an example method 300 is shown for diagnosing a leak of a bellows of a fuel of a vehicle system, such as the vehicle system described above with reference to FIGS. 1 and 2. Instructions for carrying out method 300 may be executed by a controller (e.g., controller 212) with instructions stored on a computer readable memory of the controller and in conjunction with signals received from sensors of the vehicle system, such as the sensors described above with reference to FIGS. 1 and 2. Further, the controller may employ actuators (e.g., 281) of the vehicle system to adjust operation of the fuel system 140 according to the method 300 as described below.

At 302, the method includes estimating and/or measuring vehicle operating conditions. In one example, the controller (e.g., controller 212) acquires measurements from various sensors in the engine system and estimates operating conditions such an engine off/on condition, time of day, ambient temperature, and the load of the EVAP canister. In one example, the controller receives signals indicating predicted weather conditions, e.g., temperature forecast. As an example, the controller may receive predicted weather in communication with a weather service, e.g., via V2I communication, via GPS unit in the vehicle, etc. The controller may further detect states of the valves and measure a fuel tank pressure with a pressure sensor.

At 304, the method includes determining if a key-off event is occurring. A key-off event may be occurring if a key is removed from the ignition, if a start/stop button is depressed, if a vehicle operator exits the vehicle, if a vehicle operator is a threshold distance from the vehicle, if a driver door is opened and closed, if a mobile device is the threshold distance from the vehicle, if a remote device is the threshold distance from the vehicle, or if a wireless signal is received via Bluetooth, Internet, or other wireless communication (e.g., radio signal) to turn off the vehicle.

If the key-off event is not occurring, then at 306, the method 300 may include not executing the leak test diagnostic. As such, a position of the bellows valve may be maintained. In one example, the bellows valve fluidly couples the atmospheric port to atmosphere, which couples an interior of the bellows to the atmosphere. Additionally or alternatively, the fuel tank may not be sealed via actuating the FTIV to the closed position.

If the key-off event is occurring, then at 308, the method 300 may include closing the FTIV. In one example, the controller signals to an actuator of the FTIV to actuated the FTIV to the closed position to seal the fuel tank.

At 310, the method 300 may include closing the bellows valve and activating the ELCM pump (e.g., a vacuum pump of ELCM 295 of FIG. 2). Closing the bellows valve may include where the atmospheric port is sealed from the atmosphere and the canister. As such, by closing the FTIV and the bellows valve, the fuel tank is sealed and pressure (e.g., vacuum) from the ELCM pump evacuating a canister side of the fuel system is blocked from reaching the fuel tank.

At 312, the method 300 may include determining if the FTIV is degraded. The FTIV may be degraded (e.g., stuck open) if a pressure sensor of the fuel tank indicates a vacuum flowing thereto from the ELCM pump. If the FTIV is degraded and vacuum from the pump does flow to the fuel system, then at 314, the method 300 may include indicating the FTIV is degraded. Indicating the FTIV is degraded may include activating an indicator lamp, transmitting a text or an email to the vehicle operator, placing a phone call, or the like.

At 316, the method 300 may further include adjusting operating parameters. In one example, adjusting operating parameters may include closing the canister vent valve to block vapors from flowing to atmosphere. Additionally or alternatively, vapors from the canister may be purged to the engine more frequently in response to the FTIV being stuck open.

Returning to 312, if the FTIV is not degraded and vacuum is not sensed at the fuel tank via the fuel tank pressure sensor, then at 318, the method 300 may include determining if a fuel system leak is present. The fuel system leak may be due to a fuel cap not sealing the fuel tank from atmosphere, a crack in the fuel tank, or other similar degradation. Indicating the fuel system is degraded may include activating an indicator lamp, transmitting a text or an email to the vehicle operator, placing a phone call, or the like.

At 322, the method 300 may include adjusting operating parameters. Adjusting operating parameters may include flowing fuel vapors more frequently to an intake manifold. Additionally or alternatively, an engine power output may be reduced.

If the fuel system leak is not present, then at 324, the method 300 may include estimating a fuel temperature of fuel in the fuel tank. The fuel temperature may be directly measured via a temperature sensor or inferred based on a plurality of parameters. The plurality of parameters may include one or more of a drive cycle duration, an ambient temperature, and a ground surface temperature.

At 326, the method 300 may include determining if the fuel temperature is greater than a threshold temperature or if the fuel temperature is increasing. The threshold temperature may be based on a non-zero, positive value. In one example, the threshold temperature is greater than an ambient temperature. The fuel temperature increasing may include determining if the fuel temperature is on an upswing of a diurnal temperature cycle and will increase over time.

If the fuel temperature is not greater than the threshold temperature and the fuel temperature is not increasing, then at 328, the method 300 may include maintaining the bellows valve closed. As such, a leak diagnostic of the bellows valve may not be executed. In one example, if the fuel temperature is not above the threshold temperature (e.g., an ambient temperature) or if the fuel temperature is not increasing to the threshold temperature, then a fuel vapor leak through the bellows to the canister may not be sensed via monitoring a canister temperature. As such, a leak of the bellows may not be accurately determined.

If at least one of the fuel temperature is greater than the threshold temperature or the fuel temperature is increased, then at 330, the method 300 may include opening the bellows valve and fluidly coupling the bellows to the canister. As such, the interior volume of the bellows may be fluidly coupled to the canister, or the conduit coupled to the canister, and sealed from atmosphere. At 332, the method 300 may include determining if a canister temperature is greater than an ambient temperature. The canister temperature may be sensed via a canister temperature sensor. Additionally or alternatively, the canister temperature may be estimated via a plurality of parameters. The plurality of parameters may include time elapsed since the canister is evacuated, engine run time, and ambient temperature.

If the canister temperature is not greater than the ambient temperature, then at 334, the method 300 may include determining that the bellows are leak free (e.g., not degraded). As such, hotter fuel vapors, relative to the canister temperature and ambient temperature, from the fuel tank may not flow to the canister via a crack, a hole, or other undesired opening forming a leak in the bellows.

If the canister temperature is greater than the ambient temperature, then at 336, the method 300 may include determining the bellows are degraded. The bellows may comprise a leak allowing fuel vapors to flow therethrough to the canister, which blocks the canister from approaching (e.g., cooling to) the ambient temperature during the engine off.

At 338, the method 300 may include commanding the bellows valve to remain open and fluidly couple the bellows to the canister until the leak is removed. As such, the bellows valve may be commanded to couple the bellows to the canister during all engine ON and OFF events. By doing this, vapors from the fuel tank are directed to the canister and not directly to atmosphere.

At 340, the method 300 may include indicating the bellows are leaking. The indicating may include activating an indicator lamp on a vehicle dashboard, a text, an email, a phone call, and/or a letter.

At 342, the method 300 may include adjusting operating parameters. Adjusting operating parameters in response to the leaking bellows may include increasing a frequency in which the canister is purged. Additionally or alternatively, engine operating parameters may be adjusted to prioritize ingesting fuel vapors. In one example, if the vehicle is a hybrid vehicle, durations of all-electric driving may be limited to limit vapor accumulation in the canister.

In some examples, additionally or alternatively, to avoid a fuel level of the fuel in the fuel tank from masking a leak in the bellows, the leak test diagnostic may be executed at fuel levels where fuel is below a determined volume of the bellows. By doing this, an accuracy of the leak test diagnostic may be improved.

Turning now to FIG. 4, a timing diagram 400 is shown that illustrates a sequence of actions performed within a control routine for diagnosing a fuel system or a bellows leak. The control routine may be the same as or similar to the series of actions described above in reference to the method 300 in FIG. 3. The abscissa denotes time and the vertical markers 0-t3 identify relevant times in the method 300 of FIG. 3 to diagnose a leak in the fuel system. Plot 410 illustrates a key-off event activity. Plot 420 illustrates a bellows valve position. Plot 430 illustrates a fuel tank pressure. Plot 440 illustrates a canister temperature. Plot 450 illustrates if a leak is present in the fuel system. Time increases from a left to a right side of the figure.

Prior to t1, a key-off event is not occurring (plot 410). As such, the engine may be fueled and a key-on event is occurring. During the key-on event, the leak detection diagnostic is not executed. The bellows valve position (plot 420) is in a second position, which may include where the bellows valve is open and fluidly coupling the bellows to atmosphere. As such, the bellows may not be fluidly coupled to the canister. At t1, the key-off event occurs. The leak test diagnostic is initiated. As such, the bellows valve is adjusted to a first position, which may correspond to a fully closed position. Initiation of the leak test diagnostic may further include activating a pump of the ELCM and commanding the FTIV valve to a fully closed position. As such, the fuel tank may be sealed during the initiation of the leak test diagnostic.

Between t1 and t2, the fuel tank pressure remains relatively constant. As such, vacuum from the ELCM pump is not flowing to the fuel tank, thereby indicating desired actuation of the FTIV. The relatively constant fuel tank pressure may further indicate an absence of leaks in other portions of the fuel system, such as a fuel tank wall, a fuel cap, or other fuel system component. At t2, the leak test diagnostic may transition to diagnosing the bellows. As such, the bellows valve is commanded to a third position, which corresponds to a position where the bellows is fluidly coupled to the canister. The third position may further include where the bellows is sealed from atmosphere.

Between t2 and t3, the canister temperature increases. As such, fuel vapors may be entering the bellows and flowing to the canister. The fuel tank fuel vapors may be relatively hot compared to the canister temperature. As the fuel vapors flow to the canister, it may be blocked from converging to an ambient temperature. Thus, a temperature increase or absence of a temperature decrease may indicate a leak in a body of the bellows. At t3, the presence of the leak is determined and indicated. Indication of the leak may include activating an indicator lamp, setting a code specific to a leak in the bellows, and one or more of alerting the vehicle operator via text, email, phone call, and a letter.

After t3, the bellows valve position is maintained in the third position, The key-off event is terminated by a key-on event and the bellows valve is still maintained in the third position. By doing this, the fuel vapors leaking through the bellows are captured via the canister until the leak is repaired. In response to the leak, operating parameters may be adjusted. For example, vapor combustion in the engine may be prioritized. This may include decreasing a duration of all-electric operation to reduce oversaturation of the canister with fuel vapors. Additionally or alternatively, during all-electric operation, the engine may be operated at a determined load to consume fuel vapors, wherein power generated by the engine may be used to replenish a charge of a battery.

The disclosure further provides support for a method for determining a leak in a bellows of a sealed variable volume fuel tank of a vehicle including in response to a key off event, adjusting a bellows valve to fluidly couple an internal volume of a bellows to a canister. A first example of the method further includes determining a fuel tank isolation valve is not stuck open, the fuel tank isolation valve being in fluid communication between the sealed variable volume fuel tank and the canister. A second example of the method, optionally including the first example, further includes where the bellows valve is coupled between an internal volume of bellows in the sealed variable volume fuel tank and the atmospheric port. A third example of the method, optionally including one or more of the previous examples, further includes where the bellows are coupled to a top of the sealed variable volume fuel tank relative to ground on which the vehicle travels. A fourth example of the method, optionally including one or more of the previous examples, further includes determining the leak in the bellows is present is based on a temperature of the canister increasing. A fifth example of the method, optionally including one or more of the previous examples, further includes where the bellows valve is maintained in a current position to maintain a fluid coupling between the internal volume of the bellows to the canister in response to the leak in the bellows being present. A sixth example of the method, optionally including one or more of the previous examples, further includes determining the sealed variable volume fuel tank is free of a leak prior to the determining a presence of the leak in the bellows. A seventh example of the method, optionally including one or more of the previous examples, further includes where the bellows valve is a three-way valve. An eighth example of the method, optionally including one or more of the previous examples, further includes adjusting the bellows valve to fluidly couple the internal volume of the bellows to atmosphere in response to the leak being absent.

The disclosure further provides support for a vehicle system including an evaporative emissions canister, a variable volume fuel tank, the variable volume fuel tank sealed except for only a fuel tank isolation valve port and a fuel filler pipe, the fuel tank further comprising bellows, an atmospheric port coupling an internal volume of the bellows to atmosphere or to the evaporative emissions canister, and a bellows valve positioned between the atmospheric port, a conduit coupled to atmosphere, and a vapor line coupled to the evaporative emissions canister, and a fuel tank isolation valve (FTIV) in fluid communication between the fuel tank and the evaporative emissions canister. A first example of the vehicle system further includes where the bellows valve is a three-way valve. A second example of the vehicle system, optionally including the first example, further includes where a controller with computer-readable instructions that when executed enable the controller to seal the fuel tank in response to a key-off event by commanding the bellows valve to a fully closed position and the FTIV to a fully closed position. A third example of the vehicle system, optionally including one or more of the previous examples, further includes where the instructions further enable the controller to determine a leak in the variable volume fuel tank or degradation of the FTIV in response to a fuel tank pressure decreasing during a key-off event. A fourth example of the vehicle system, optionally including one or more of the previous examples, further includes where the instructions further enable the controller to determine a leak in the bellows following determination of an absence of a leak in the variable volume fuel tank and the FTIV not being degraded via opening the bellows valve to fluidly couple an interior volume of the bellows to the evaporative emissions canister, wherein determination of the leak being present is in response to a temperature of the evaporative emissions canister increasing during the key-off event. A fifth example of the vehicle system, optionally including one or more of the previous examples, further includes where the bellows valve is maintained in the open position and fluid couples the interior volume of the bellows to the evaporative emissions canister during the key-off event and during a key-on event.

The disclosure further provides support for a system for a hybrid vehicle including a variable volume fuel tank, a fuel tank isolation valve configured to adjust coupling between the variable volume fuel tank and a canister, a bellows valve configured to adjust coupling between an interior volume of a bellows and one of the canister or atmosphere, and a controller comprising computer-readable instructions stored on non-transitory memory thereof that when executed enable the controller to execute a leak test diagnostic in response to a key-off event, the leak test diagnostic comprising indicating a degradation of the fuel tank isolation valve in response to a fuel tank pressure decreasing, and diagnose a presence or an absence of a leak in the bellows in response to the fuel tank isolation valve not being degraded via adjusting the bellows valve to fluidly couple the interior volume to the canister. A first example of the system further includes where the leak in the bellows is present in response to a temperature of the canister increasing. A second example of the system, optionally including the first example, further includes where the instructions further enable the controller to maintain the interior volume of the bellows fluidly coupled to the canister in response to the presence of the leak in the bellows. A third example of the system, optionally including one or more of the previous examples, further includes where the instructions further enable the controller to adjust the bellows valve to fluidly couple the interior volume of the bellows to atmosphere in response to the absence of the leak during a subsequent key-on event. A fourth example of the system, optionally including one or more of the previous examples, further includes where the instructions further enable the controller to diagnose the leak in the bellows in response to a fuel temperature being greater than a threshold temperature or a fuel temperature increasing.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for determining a leak in a bellows of a sealed variable volume fuel tank of a vehicle, comprising:
   in response to a key off event, adjusting a bellows valve to fluidly couple an internal volume of a bellows to a canister.

2. The method of claim 1, further comprising determining a fuel tank isolation valve is not stuck open, the fuel tank isolation valve being in fluid communication between the sealed variable volume fuel tank and the canister.

3. The method of claim 2, wherein the bellows valve is coupled between the internal volume of the bellows in the sealed variable volume fuel tank and an atmospheric port.

4. The method of claim 3, wherein the bellows are coupled to a top of the sealed variable volume fuel tank relative to ground on which the vehicle travels.

5. The method of claim 1, wherein determining the leak in the bellows is based on a temperature of the canister increasing.

6. The method of claim 1, wherein the bellows valve is maintained in a current position to maintain a fluid coupling between the internal volume of the bellows to the canister in response to the leak in the bellows being present.

7. The method of claim 1, further comprising determining the sealed variable volume fuel tank is free of a leak prior to the determining the leak in the bellows.

8. The method of claim 1, wherein the bellows valve is a three-way valve.

9. The method of claim 8, further comprising adjusting the bellows valve to fluidly couple the internal volume of the bellows to atmosphere in response to the leak being absent.

10. A vehicle system, comprising:
    an evaporative emissions canister;
    a variable volume fuel tank, the variable volume fuel tank sealed except for only a fuel tank isolation valve port and a fuel filler pipe, the variable volume fuel tank further comprising:
    bellows;
    an atmospheric port coupling an internal volume of the bellows to atmosphere or to the evaporative emissions canister; and
    a bellows valve positioned between the atmospheric port, a conduit coupled to atmosphere, and a vapor line coupled to the evaporative emissions canister, wherein the bellows valve is a three-way valve; and
    a fuel tank isolation valve (FTIV) in fluid communication between the variable volume fuel tank and the evaporative emissions canister.

11. The vehicle system of claim 10, further comprising a controller with computer-readable instructions that when executed enable the controller to seal the variable volume fuel tank in response to a key-off event by commanding the bellows valve to a fully closed position and the FTIV to a fully closed position.

12. The vehicle system of claim 11, wherein the computer-readable instructions further enable the controller to determine a leak in the variable volume fuel tank or degradation of the FTIV in response to a fuel tank pressure decreasing during a key-off event.

13. The vehicle system of claim 11, wherein the computer-readable instructions further enable the controller to determine a leak in the bellows following determination of an absence of a leak in the variable volume fuel tank and the FTIV not being degraded via opening the bellows valve to fluidly couple an interior volume of the bellows to the evaporative emissions canister, wherein determination of the leak being present is in response to a temperature of the evaporative emissions canister increasing during the key-off event.

14. The vehicle system of claim 13, wherein the bellows valve is maintained in the open position and fluidly couples the interior volume of the bellows to the evaporative emissions canister during the key-off event and during a key-on event.

15. A system for a hybrid vehicle, comprising:
a variable volume fuel tank;
a fuel tank isolation valve configured to adjust coupling between the variable volume fuel tank and a canister;
a bellows valve configured to adjust coupling between an interior volume of a bellows and one of the canister or atmosphere; and
a controller comprising computer-readable instructions stored on non-transitory memory thereof that when executed enable the controller to:
execute a leak test diagnostic in response to a key-off event, the leak test diagnostic comprising indicating a degradation of the fuel tank isolation valve in response to a fuel tank pressure decreasing; and
diagnose a presence or an absence of a leak in the bellows in response to the fuel tank isolation valve not being degraded via adjusting the bellows valve to fluidly couple the interior volume of the bellows to the canister.

16. The system of claim 15, wherein the leak in the bellows is present in response to a temperature of the canister increasing.

17. The system of claim 15, wherein the computer-readable instructions further enable the controller to maintain the interior volume of the bellows fluidly coupled to the canister in response to the presence of the leak in the bellows.

18. The system of claim 15, wherein the computer-readable instructions further enable the controller to adjust the bellows valve to fluidly couple the interior volume of the bellows to atmosphere in response to the absence of the leak during a subsequent key-on event.

19. The system of claim 15, wherein the computer-readable instructions further enable the controller to diagnose the leak in the bellows in response to a fuel temperature being greater than a threshold temperature or a fuel temperature increasing.

* * * * *